United States Patent [19]

Janssen

[11] E Re. 29,963

[45] Reissued Apr. 10, 1979

[54] SERVO SYSTEM FOR READING FROM A DISC-SHAPED RECORD CARRIER CONTAINING SIGNALS CODED IN OPTICAL FORM

[75] Inventor: Peter J. M. Janssen, Eindhoven, Netherlands

[73] Assignee: U.S. Philips Corporation, New York, N.Y.

[21] Appl. No.: 749,338

[22] Filed: Dec. 10, 1976

Related U.S. Patent Documents

Reissue of:

[64] Patent No.: 3,854,015
Issued: Dec. 10, 1974
Appl. No.: 335,934
Filed: Feb. 26, 1973

[30] Foreign Application Priority Data

Mar. 29, 1972 [NL] Netherlands ..... 7204205

[51] Int. Cl.[2] ..... H04N 5/84; G11B 7/00

[52] U.S. Cl. ..... 358/128; 179/100.3 B; 179/100.3 D; 179/100.3 V; 360/10; 360/77

[58] Field of Search ..... 358/128; 179/100.3 V, 179/100.3 B, 100.3 D, 100.41 L; 250/201, 202, 203 R, 570; 340/173 LM; 360/10, 70, 71, 72, 77; 365/120, 124

[56] References Cited

U.S. PATENT DOCUMENTS

| | | | |
|---|---|---|---|
| 3,381,086 | 4/1968 | De Moss et al. | 179/100.3 V |
| 3,530,258 | 9/1970 | Gregg et al. | 179/100.3 V |
| 3,654,624 | 4/1972 | Becker et al. | 340/173 LM |
| 3,737,877 | 6/1973 | Feinlab | 179/100.3 V |
| 3,767,848 | 10/1973 | Schuller et al. | 358/128 |
| 3,908,080 | 9/1975 | Broadbent | 179/100.3 V |

FOREIGN PATENT DOCUMENTS

| | | | |
|---|---|---|---|
| 46-19488 | 6/1971 | Japan | 360/10 |

OTHER PUBLICATIONS

World Premier Video Disc, AEG–Telefunken & Teldec Publication, pp. 22–23, 6/70.

*Primary Examiner*—Raymond F. Cardillo, Jr.
*Attorney, Agent, or Firm*—Thomas A. Briody; William J. Streeter; Simon L. Cohen

[57] ABSTRACT

Apparatus for reading a disc-shaped record carrier in which video and/or audio information is recorded in a preferably spiral track. This information is optically read by means of a beam of radiation which via a reflecting element transmits the information present in the scanned point of the record carrier to a read detector. The radial position of the scanning point is controlled by controlling the angular position of the reflecting element which for this purpose is included in a control loop. In order to reproduce the information at a speed different from the recording speed, for example to display slow-motion pictures or still pictures, the reflecting element may be subjected by means of a control signal to an abrupt change in angular position so that the scanning point undergoes an abrupt radial displacement. This displacement preferably takes place during the frame flyback periods of the video information.

14 Claims, 6 Drawing Figures

Figure 1:
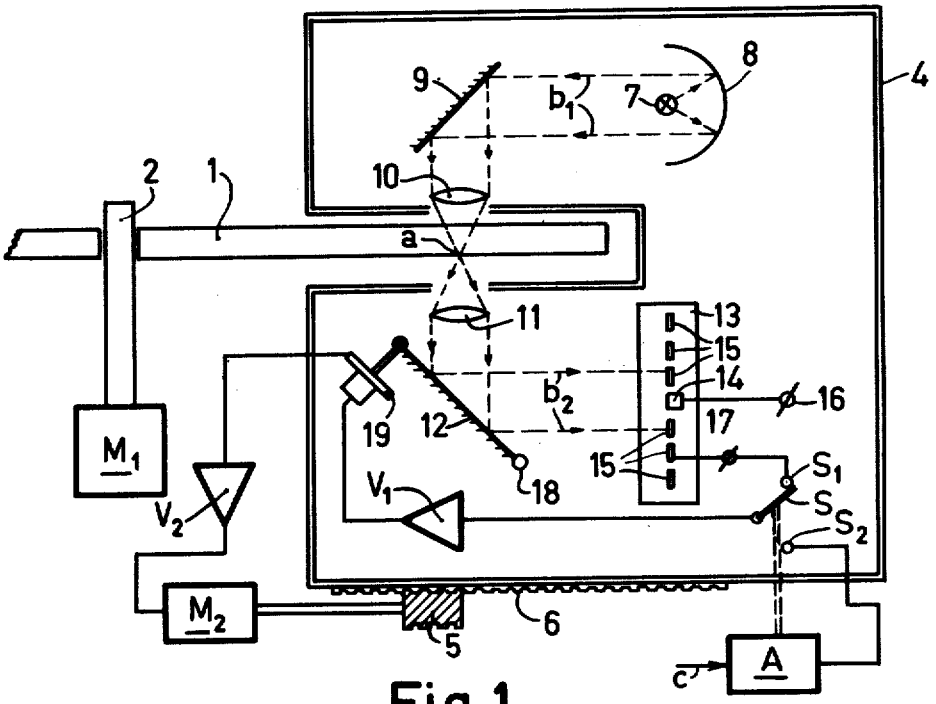

SERVO SYSTEM FOR READING FROM A DISC-SHAPED RECORD CARRIER CONTAINING SIGNALS CODED IN OPTICAL FORM

Matter enclosed in heavy brackets [ ] appears in the original patent but forms no part of this reissue specification; matter printed in italics indicates the additions made by reissue.

The invention relates to an apparatus for reading a disc-shaped record carrier on which signals, in particular video and/or audio signals, are recorded in tangential tracks, which apparatus includes an optical read unit and comprising a source of radiation, a direction system and a read detector, which source of radiation emits a beam of radiation which by means of the directive system transfers the information present in the scanning point of the record carrier to this read detector, a measuring detector for measuring the radial position of the scanning point relative to the desired track, and a control system for controlling this radial position of the scanning point on the desired track, which control system comprises a first control loop which includes the measuring detector and a first driving device enabling the radial position of the read unit to be controlled, and a second control loop which includes the measuring detector and a second driving device enabling the angular position of a rotatable element, included in the directive system relative to the incident beam of radiation and hence the radial position of the scanning point to be controlled.

Such an apparatus is described in U.S. Pat. No. 3,381,086. In the apparatus described in this specification the read detector and the measuring detector are combined. The beam of radiation which passes through the information carrier is imaged by an optical system on the rotatable element which in this known apparatus has two reflecting surfaces which reflect the beam of radiation to two detector elements. The difference signal from these detector elements is used as a control signal for both driving devices, while the sum signal becomes available as a video output signal.

The two control loops ensure that the scanning point always accurately follows the information track on the carrier. In general, this information track is spiral, so that the scanning point is to be displaced in a radial direction at an approximately uniform speed. This uniform motion in general is effected by the first driving device, while the second driving device must in general be capable, by rotation of the rotatable element, of following rapid variations of the radial position of the information track, for example due to eccentricity of the pivot point relative to the center of the record carrier, in order to insure continuous reading of the information track.

It is an object of the present invention to provide an apparatus of the aforementioned type which permits the information, in particular the video information, recorded on the record carrier to be displayed at a speed different from the recording speed by simple means. More particularly slow-motion or slice pictures are concerned, however, quick-motion pictures or even pictures which go back in time may be desired.

For this purpose, the apparatus according to the invention is characterized in that it contains switching means which enable a switching cycle to be performed which comprises opening at least the second control loop, applying to the second driving device a control signal obtained from a signal source such as to cause the second drive device to pivot the rotatable element through a given angle, and closing the control loop again.

The step according to the invention ensures that after a command the scanning point on the carrier is caused to jump in a radial direction. The result achieved depends upon the repetition frequency of the command and the magnitude and the direction of the jump or displacement of the scanning point. If the record carrier contains a spiral information track which starts at the outer circumference, a still picture is obtainable by displacing the scanning point outwards through one track spacing after each revolution of the record carrier, so that always the same portion of the information track is scanned. If the record is to be displayed at one half of the recording speed, the scanning point will be displaced outwards through one track spacing after each two revolutions. It will be clear that thus many modifications of the display speed are possible.

The record carriers used in the apparatus according to the invention usually contain an integral number of pictures per revolution, because thus a given part of the recorded picture is always stored in radially adjacent points of successive tracks. Because the video information changes very little from picture to picture, this means that the difference between information stored in radially corresponding points of adjacent tracks is small, so that the likelihood of interference due to crosstalk between adjacent tracks is greatly reduced.

A preferred embodiment of the apparatus according to the invention utilizes the said choice of the recording pattern by ensuring that a jump of the scanning point from one track to another is commenced at an instant which at least substantially corresponds to a frame flyback pulse in the recorded video signal, for in this recording pattern the portions of the information track which correspond to the frame flyback periods will be readily adjacent in successive tracks. By starting the jump of the scanning point at the beginning of such a frame flyback period of a track the scanning point after the jump, provided that the jump is fast enough, falls in a frame flyback period recorded in the new track. This means that the jump of the scanning point entirely takes place in a period in which the image is suppressed, so that this jump does not introduce disturbances in the visible picture. Obviously, the starting pulses for the switching cycle may be caused to lay behind the frame flyback pulses to enable the old track to be followed during part of this frame flyback period in order to read certain information, for example information relating to the desired repetition frequencies and the like of the switching cycles.

Instead of an information carrier provided with a spiral information track a carrier provided with concentric tracks may be used in the apparatus according to the invention. If, for example, one picture is recorded in each concentric track, in the case of display at the normal speed the scanning point will have to jump one track spacing after each revolution of the record carrier. The use of such concentric tracks, however, may be of particular importance when the apparatus is used to display the same picture for a prolonged period of time accompanied by a continuous spoken text. By causing the scanning point to follow the same track for a given period, which mode of operation does not require any switching cycle in the case of concentric tracks, the picture may be retained for any desired time. The sound assigned to this period may also be recorded in this concentric track by several methods, but obviously provisions must be made to produce a continuous audio signal. As an example we may mention recording the sound in frequency multiplex, the sound carrier being changed after each revolution. In this case the read apparatus also must be switched to this changed carrier frequency after each revolution. Obviously, care may be taken to ensure that there is a certain regularity in the variation of this carrier frequency or an additional indicating signal may be recorded on the carrier which each time gives an indication with respect to the carrier frequency.

Figure 2:
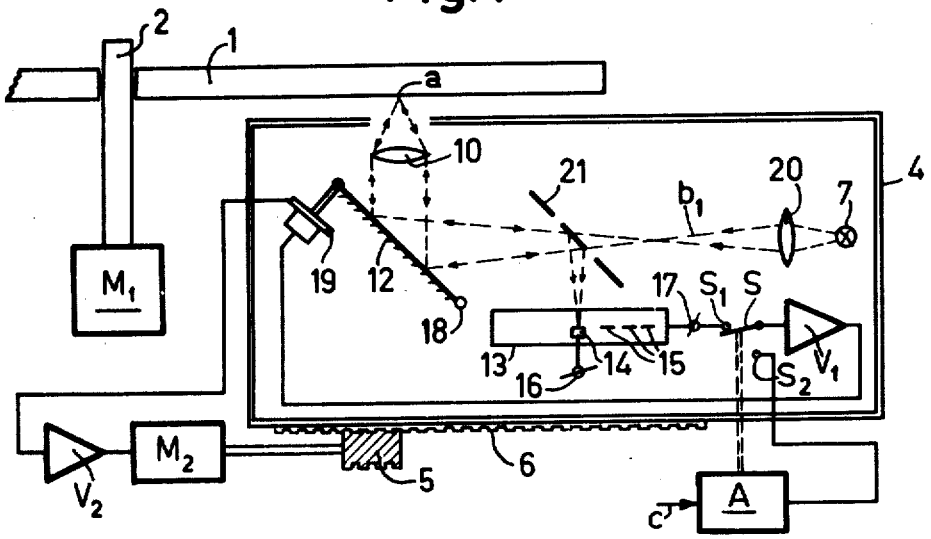
Figure 3:
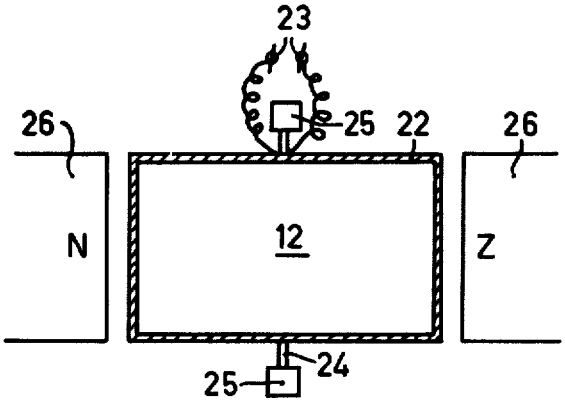
Figure 4:
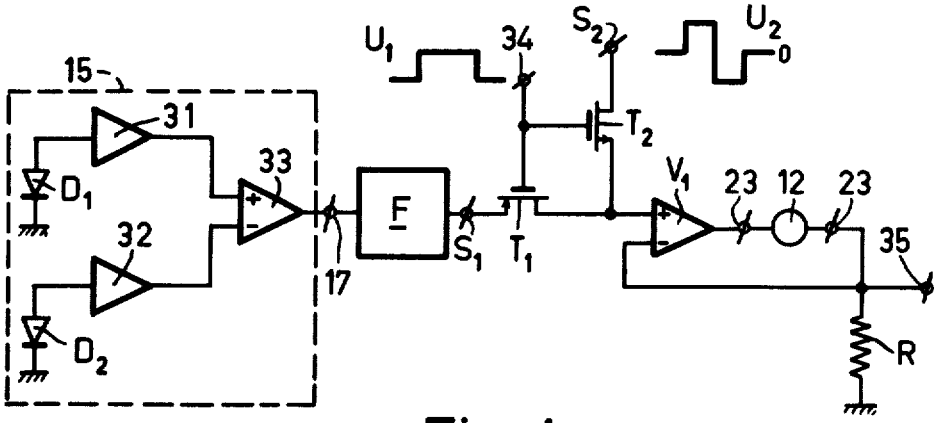
Figure 5:
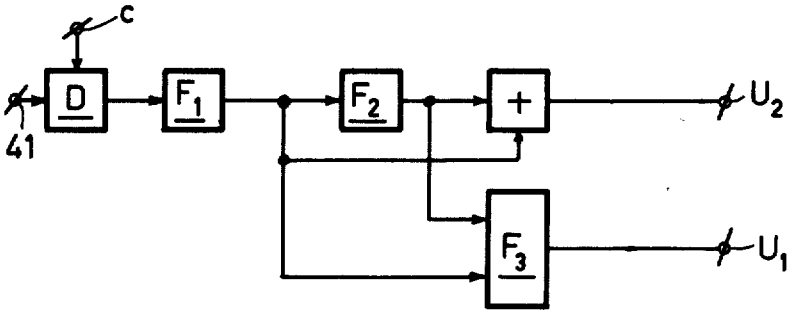
Figure 6:
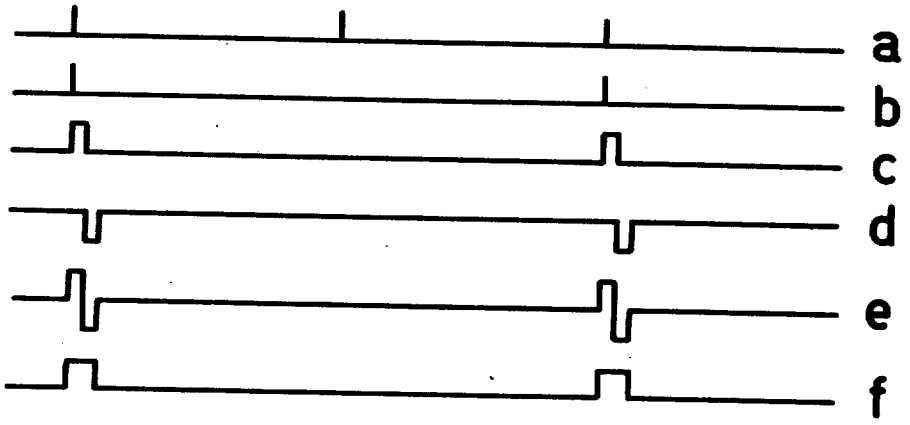

Embodiments of the invention will now be described, by way of example, with reference to the accompanying diagrammatic drawings, in which:

FIGS. 1 and 2 show two embodiments of a read apparatus according to the invention, FIG. 3 shows a particularly simple design of the reflecting element required in this apparatus, with the associated drive, FIG. 4 shows an embodiment of the first control loop including a switching unit, FIG. 5 shows an embodiment of a unit for supplying the voltages for controlling the switching units shown in FIG. 4, and FIG. 6 shows voltage wave forms which occur in this unit.

Referring now to FIG. 1, a disc-shaped record carrier 1 is driven into rotation by a motor $M_1$ via a spindle 2 which passes through a center hole in the record carrier. The record carrier may be either a solid disc made of a rigid material or a thin foil. The record carrier 1 is provided with an information track which in general is spiral and in which video and/or audio signals are recorded in optical form. These signals may be stored both in frequency-modulated and in amplitude-modulated form. The signals are read by means of a beam of radiation which, depending on the manner in which the information is recorded on the record carrier, is amplitude-modulated or phase-modulated by this information. For the control means described hereinafter the method of modulation and the mode of recording on the record carrier are of minor importance, so that they will not be described further.

As has been mentioned hereinbefore, the information is read by means of a beam of radiation. This beam of radiation is produced, and the information contained in it after interaction with the record carrier is detected, by means of an optical system accommodated in a casing 4. This optical system comprises a source of light 7 and a mirror 8 by which the light from the source is collimated into a beam of radiation $b_1$. This beam of radiation is reflected towards the record carrier by means of a plane mirror and focussed by a lens 10 on the surface of the record carrier on which the information is recorded, in the present exemplary case a lower surface. The beam of radiation which after being modulated by this information emerges from the carrier is reflected via a lens 11 and a plane mirror 12 to a detector unit 13 as a collimated beam of radiation $b_2$. A scanned point a of the record carrier thus is imaged on a read detector 14 which detects the information contained in the beam, the detected information appearing at an output terminal 16.

To ensure continuous reading of the information the scanning point imaged on the read detector 14 must always follow the information track provided on the record carrier 1. If this information track is spiral, the scanning point a must firstly be displaced in a radial direction at a speed which corresponds to the pitch of this spiral information track. Furthermore the scanning point must be capable of following any rapid radial displacements of the information track, for example owing to eccentricity of the "carrier" hole in the record carrier.

This necessary control of the radial position of the scanning point a is effected by cooperation of two controls, a coarse control capable only of producing a slow radial displacement of the scanning point and a fine control capable of producing a comparatively small but fast displacement of the scanning point. In the embodiment shown the course control is provided by a motor $M_2$ which via a servo amplifier $V_2$ receives a control signal and is capable of displacing the casing 4 in a radial direction by means of a gear, for example a wormwheel 5 and a worm 6. The fine control is effected by pivoting the plane mirror 12 about a pivot 18. It is assumed that the area of the record carrier illuminated by the beam of radiation comprises several tracks, so that pivotal movement of the mirror 12 causes the scanning point imaged by this mirror on the read detector 14 to be radially displaced. The pivotal movement of the mirror 12 is produced by a driving element 19, which may be any suitable element. This driving element 19 receives a control signal from a servo amplifier $V_1$. The element may, for example, by a piezoelectric element. Such an element in general comprises a plurality of slices of a piezoelectric material and interjacent electrodes. To enlarge the deflection produced by such an element, for example, a suitable lever system may be used by which the movements of the piezoelectric element are transmitted to the reflecting element. Also, a liquid amplifier may be used in which the piezoelectric element is secured to a first diaphragm which forms a wall of a liquid-filled closed space. The movements of this first diaphragm are transmitted via the liquid to a second diaphragm this movement being amplified by a factor determined by the ratio between the surface areas of the two diaphragms.

Also a piezoelectric torsion element may be used to advantage by causing this element to act as the pivot of the reflecting element.

Instead of a reflecting element it is also possible to use a light transmitting element, which by a rotation changes the deflection of the beam of radiation.

The information about the position of the scanning point a relative to the information track, which information is required for this control, is obtained by means of a measuring detector 15 which forms part of the detector unit 10. This measuring detector 15 also may be constructed in various manners, for example as described in the aforementioned U.S. Pat. No. 3,381,086, in which the measuring and read detectors are combined, or as described in U.S. Ser. No. 229,291, filed Feb. 25, 1972. The measuring detector 15 shown schematically in the Figure consists, according to an embodiment of the said application, of a grating made up of radiation-transmitting and radiation-absorbing strips. This grating is shown greatly enlarged in the Figure and actually will lie within the radiation beam $b_2$. Since the beam of radiation illuminates a plurality of tracks, for example 50 tracks, of the record carrier, there will be formed on the measuring detector an image which corresponds to the track pattern and hence also has the structure of a grating. By means of suitable pick-up elements the position of this grating-shaped image of the track pattern relative to the grating-shaped detector produces a signal which is representative of the position of the scanning point a relative to the desired track, which signal may be derived from an output terminal 17. This signal is used as the control signal for the driving device 19 and for this purpose is applied to the serve amplifier $V_1$ via a switch S.

The control signal for the coarse control to be applied to the servo amplifier $V_2$ may obviously also be taken from the output terminal 17 via a suitable network. However, the control signal for the motor $M_2$ as shown in FIG. 1 is a signal which is a measure of the mean deflection of the mirror 12 relative to a central position. Such a signal may be obtained in a variety of manners which will be obvious to one skilled in the art, for example by means of capacitive or inductive transducers, and therefore the Figure shows schematically only the manner in which the desired signal is derived from the driving element 19. Naturally, the coarse control may alternatively be used intermittently, i.e. only when the deflection of the mirror 12 with respect to its center position exceeds a given limit. In the case of a spiral information track on the record carrier, however, the first mentioned configuration in which the mean deflection of the mirror provides the control signal for the coarse control, will produce a smoother servo behaviour.

Thus, it is ensured by means of the said control systems that the scanning point a continuously follows the information track. If, for example, a still picture is to be displayed, the scanning point, after having followed the information track for a given time, for example, for at least one period of revolution of the record carrier, will have to jump back at least one track spacing to enable the information to be repeatedly read. For this purpose a switching unit A is provided which is capable of operating the switch S. If this switching unit A at its control input c receives a starting signal, a switching cycle is started during which first the switch S is changed over from the position $S_1$ to the position $S_2$. This opens the control loop for the radial position of the scanning point. After the switch S has been switched to the position $S_2$, the switching unit via this switch S and the servo-amplifier $V_1$ applies to the driving unit 19 a signal such that the mirror 12 is pivoted through an angle such that the scanning point a jumps, approximately one track spacing. Subsequently the switching cycle is terminated in that the switching unit A returns the switch to the position $S_1$, so that the control loop is closed again and the scanning point a is maintained again on the new track.

It will be appreciated that the aforedescribed switching cycle should be performed as fact as possible. This imposes certain requirements on the servo system, the design of the mirror 12 and the switching signal to be applied by the switching unit to the servo system, which requirements will be discussed hereinafter.

However, first a second embodiment of the optical system will be described with reference to FIG. 2. In this embodiment the transmitted beam of radiation is replaced by a beam of radiation reflected by the record carrier. Elements corresponding to those of FIG. 1 are denoted by the same reference symbols.

The required radiation beam $b_1$ is again obtained by means of a source of light 7 and is converged by a lens 20. Via a half-silvered mirror 21 the converged beam falls on a plane mirror 12 which reflects it towards the record carrier 1. The reflected beam is focussed on the record carrier by a lens 10. The radiation beam reflected by the record carrier 1 is reflected by a plane mirror 12 to the half-silvered mirror 21. The part $b_2$ of the beam which is reflected by the mirror 21 falls on a detector unit 13 which includes a signal detector 14 on which the scanned point a is imaged.

The mirror 12 is pivotable and the casing 4 is radially displaceable by means of a control system constructed identically with that shown in FIG. 1. With respect to the size of the area on the record carrier illuminated by the radiation there are two possibilities. If this area contains a plurality of tracks, the said radiation beam may again be used to obtain the desired information about the radial position of the scanning point a, for these illuminated tracks can be imaged on a measuring detector 15 adjacent to the signal detector 14 and having, for example, a grating-shaped pattern. In this case either the signal detector 14 must have a width which substantially corresponds to the width of the image of the information track provided on the record carrier, or only a small part of the image must be transmitted to the detector.

As an alternative, however, the area of the record carrier illuminated by the radiation beam may comprise only a single track. Since in this case this track only is imaged on the signal detector, there is no objection to the detector 14 being larger. Obtaining a signal which is representative of the radial position of the scanning point a now requires a second radiation beam, not shown, which forms an image of a plurality of tracks on the measuring detector 15. The switch S and the switching unit A may be provided in a manner identical to that shown in FIG. 1.

FIG. 3 shows a particularly simple and advantageous embodiment of the plane mirror 12 together with the drawing element 19. The mirror 12 is adapted to pivot about a pivot 24 which passes through the center of gravity of the mirror and is journalled in bearings 25. The driving element 19 is constituted by windings 22 which are wound around the circumference of the mirror and are arranged in a magnetic field produced by pole pieces 26. By supplying a control current to terminals 23 which form the ends of the windings 22, the mirror is pivoted against the force of a spring, the pivoting angle being determined by the magnitude of the current. The advantage of the embodiment of the mirror and its drive shown are the simplicity and lightweight construction, enabling very fast changes in the radial position of the scanning point a to be followed. Another related embodiment consists in that a permanent magnet is mounted on the mirror and the mirror is arranged in a variable magnetic field.

FIG. 4 shows schematically the manner in which the switch S may be constituted by electric means and incorporated in the control system. The measuring detector 15 is schematically indicated by $D_1$ and $D_2$ and is assumed to comprise two sub-detectors so as to obtain an indication both of the magnitude and of the direction of the deviation of the radial position of the scanning point. The signals produced across the sub-detectors $D_1$ and $D_2$ are applied via separating amplifiers 31 and 32 respectively to a differential amplifier 33 at an output terminal 17 of which the said control signal appears. This control signal is applied to a phase correction network F by means of which a desired servo behaviour is realized.

The output of this phase correction network F is connected via the main current path of a first field effect transistor $T_1$ to the plus input of an amplifier $V_1$ which, for example, supplies a control current to the terminals 23 of a mirror drive designed in the manner shown in FIG. 3. The magnitude of this control current is a measure of the deflection of the mirror and hence may be used for the coarse control. For this purpose a resistor R is provided which is traversed by this control current and from a terminal 35 of which a voltage may be derived which after integration is applied to the coarse control. The voltage produced across the resistor R is also used as a negative-feedback voltage and applied to the minus input of the amplifier $V_1$.

The plus input of the amplifier $V_1$ is also connected, via the main current path of a second field effect transistor $T_2$, to a terminal $S_2$. If the field-effect transistors $T_1$ and $T_2$ are of opposite conductivity types, their control electrodes may be connected to one another and to one control terminal 34. At this control terminal 34 there is normally set up a voltage $U_1$ such that the transistor $T_1$ is conducting and the transistor $T_2$ is non-conducting, so that the terminal $S_1$ is connected to the input of the amplifier $V_1$ and the control loop is closed. To open the control loop a square-wave voltage $U_1$ is applied to the terminal 34 so that the transistor $T_1$ is rendered non-conducting. Simultaneously the transistor $T_2$ becomes conducting, so that a signal applied to the terminal $S_2$ is capable of reaching the amplifier $V_1$. To this terminal $S_2$ a voltage $U_2$ is applied such that the mirror 12 is pivoted through a given angle. The control voltage applied to the terminal $S_2$ preferably has a waveform which is symmetrical about zero, because in this case the mirror on termination of this control voltage becomes stationary again, for the pivoting speed may be represented as the integral of this voltage $U_2$. Instead of the square-wave voltage shown, for example, one period of a sinusoidal voltage may be used. On termination of the voltage $U_2$ the voltage $U_1$ also returns to its initial value, so that the transistor $T_2$ is again rendered non-conducting and the transistor $T_1$ becomes conducting again, with the result that the control loop is closed again.

FIG. 5 is a block schematic view of a circuit arrangement by means of which the voltages $U_1$ and $U_2$ shown in FIG. 4 may simply be obtained, the waveforms of the voltages which are produced in this circuit arrangement being shown in FIG. 6. Through an input terminal 41 the frame pulses separated from the video signal (FIG. 6a) are applied to a divider stage D the divisor of which is adjustable by means of the signal at the control input C. In the embodiment shown it is assumed that the divisor is equal to 2, so that one of each two frame pulses is transmitted (FIG. 6b). These pulses are applied to a first monostable multivibrator $F_1$ which converts them into square-wave voltages having a given fixed width (FIG. 6c). The trailing edge of this square-wave voltage triggers an identical second monostable multivibrator $F_2$, which as a result supplies a square-wave voltage of the same width but of opposite polarity (FIG. 6d). The output voltages of the two monostable multivibrators $F_1$ and $F_2$ are added and provide the desired control signal $U_2$ (FIG. 6e). Simultaneously the output voltages of these multivibrators $F_1$ and $F_2$ are applied to a bistable multivibrator $F_3$ which is set by the leading edges of the pulses from $F_1$ and is reset by the trailing edges of the pulses from $F_2$ and as an output voltage delivers the desired switching voltage $U_1$ (FIG. 6f).

Obviously, the read apparatus according to the invention is not restricted to the embodiments shown in the drawings.

The apparatus according to the invention enables highly advanced programs to be realized, or on the one hand it enables a normal program to be displayed at different speeds, and on the other hand it provides the possibility of programming the video and audio reproduction by means of programming signals which also are recorded on the record carrier. This, may, for example, be particularly useful in educational programs in which it is permissible to display the same picture for a comparatively long time. By recording an appropriate program signal on the record carrier the picture may be retained for a fixed time, whereas the sound proceeds continuously, for example by means of multiplex techniques. This naturally enables the duration of the playing time to be considerably increased.

In addition to small jumps of the scanning point it may in some cases, for example when the record carrier is used as a storage disc, be useful to radially displace the scanning point through a larger distance by applying a control signal to the coarse control.

What is claimed is:

1. Apparatus for reading a disc-shaped record carrier [of the type] wherein video and/or audio signals are recorded in [tangential] *substantially spiral* tracks, the apparatus being of the type wherein an optical system directs a light beam from a light source to the record carrier, and images the information from the record carrier on a radiation detector means for converting the optical image into an electrical signal, wherein position detector means for measuring the radial position of the optical system relative to a desired track provides position signals to a coarse position feedback loop for moving the optical system radially with respect to the record carrier and further provides position signals to a fine position feedback loop, wherein the fine position feedback loop controls a beam deflection means pivotally mounted in the path of the light beam of the optical system for selectively angularly redirecting said beam with respect to said radiation detector means in response to said position signals from said fine position feedback loop, the improvement wherein switching means are provided in said fine position feedback loop for selectively opening said fine position feedback loop and for providing a preselected auxiliary control signal to said beam deflection means thereby angularly deflecting said beam by a predetermined amount and for subsequently reconnecting said fine position feedback loop.

2. Apparatus as claimed in claim 1, wherein said beam deflection means comprises a rotatably mounted beam deflector element, and a winding which is rigidly secured to the rotatable element and is arranged in a magnetic field and to which is applied the fine position feedback signal.

3. Apparatus as claimed in claim 1, wherein said beam deflection means comprises a rotatably mounted beam deflector element, and a magnetic element which is rigidly secured to the rotatable element and is arranged in a magnetic field which is variable in accordance with said fine position feedback signal.

4. Apparatus as claimed in claim 1, wherein said beam deflection means comprises a rotatably mounted beam deflector element, and a piezoelectric torsion element which serves as a pivot for the rotatable element and to which a control signal is applied from said fine position feedback loop.

5. Apparatus as claimed in claim 1 further comprising means for deriving said coarse position feedback signals from said fine position feedback loop.

6. Apparatus as claimed in claim 1, further comprising a first transistor having a main current path included in the connection between the position detector means and the fine position feedback loop and having a control input, a second transistor, means connecting the fine position feedback loop to the signal source via a main current path of the second transistor, the control electrodes of the first and second transistors comprising means for receiving control signals for normally forward biassing the first transistor and cutting off the second transistor and during the switching cycle for cutting off the first transistor and forward biassing the second transistor.

7. Apparatus as claimed in claim 1, wherein the switching means comprises a first monostable multivibrator to which is applied the starting pulse for the switching cycle, a second monostable multivibrator which is controlled by the output signal of the first multivibrator, an adding circuit means for adding the output signals of the first and second multivibrators with mutually inverse polarities to one another and for applying the resulting sum signal as a control signal to the second driving device, and a third bistable multivibrator which is controlled by the output signals from the first and second multivibrators for providing an output signal for opening the control loop during the switching cycle.

8. Apparatus as claimed in claim 1 for reading video and audio information, further comprising means for continupously reproducing the audio information while repeating the display of the same video information.

9. Apparatus as claimed in claim 1, wherein the rotatable element is a reflecting element.

10. Apparatus as claimed in claim 1, wherein the starting instants and the sequency of the switching cycles are determined by command signals present on the record carrier and wherein said apparatus further comprises means for controlling said means for opening and closing said fine position feedback loop.

11. Apparatus as claimed in claim 1, wherein the switching means comprises means for detecting the frame pulses in the video signal read from the record carrier, a programming unit means connected to the frame pulse detecting means for selecting and for delivering selected frame pulses as starting pulses for the switching cycle.

12. Apparatus as claimed in claim 11, further comprising means in said programming unit for performing said selection in accordance with a programming signal which is read from the record carrier.

*13. Apparatus for reading a disc-shaped record carrier wherein video and/or audio signals are recorded in substantially spiral tracks, comprising optical system means for directing a light beam to the record carrier whereby the light beam is modulated by the record carrier, and for transforming the modulated light beam into an electrical signal, means for converting said electrical signal into a radial tracking control signal corresponding to the radial position of the optical system means relative to a desired track, coarse position control means for moving the optical system means radially with respect to the record carrier in response to said radial tracking control signal, beam redirecting means in the path of the light beam in the optical system means and connected to said signal converting means for selectively radially deflecting said optical system means with respect to said desired track in response to said tracking control signal, said optical system means, converting means and beam redirecting means comprising a fine position feedback loop, and switching means in said fine position feedback loop for selectively disabling said fine position feedback loop and for providing a preselected auxiliary control signal to said beam redirecting means thereby deflecting said optical system means by a predetermined amount and for subsequently reactivating said fine position feedback loop.*

*14. Apparatus for reading a disc-shaped record carrier wherein video and/or audio signals are recorded in substantially spiral tracks, comprising optical system means for directing a light beam to the record carrier whereby the light beam is modulated by the record carrier, and for transforming the modulated light beam into an electrical signal, means for converting said electrical signal into a radial tracking control signal corresponding to the radial position of the optical system means relative to a desired track, coarse position control means for moving the optical system means radially with respect to the record carrier in response to said radial tracking control signal, beam redirecting means in the path of the light beam in said optical system means and connected to said signal converting means for selectively radially deflecting said optical system means relative to said desired track in response to said tracking control signal, said optical system means, converting means and beam redirecting means comprising a fine position feedback loop, and switching means in said fine position feedback loop for replacing said radial tracking control signal with a preselected auxiliary control signal thereby deflecting the optical system means by a predetermined amount and for subsequently removing said preselected auxiliary control signal and reinstating said radial tracking control signal.*

* * * * *